INVENTOR.
FREDERICK S. SCHILER
BY Freeman + Taylor
ATTORNEYS

INVENTOR.
FREDERICK S. SCHILER
BY Freeman & Taylor

ATTORNEYS

United States Patent Office 3,501,840
Patented Mar. 24, 1970

1

3,501,840
MEASURING DEVICE HAVING SAG
COMPENSATION MEANS
Frederick S. Schiler, Stow, Ohio, assignor to Portage
Machine Company, Akron, Ohio, a corporation of Ohio
Filed Mar. 17, 1966, Ser. No. 535,231
Int. Cl. G01b 5/00
U.S. Cl. 33—169                 9 Claims

ABSTRACT OF THE DISCLOSURE

In the use of precision measuring instruments that involve movement with respect to elongated components, problems of sag occur as the weight is shifted with respect to the point of support. In the layout machine of the present invention such sag can occur in two directions with sag of the cross arm normally occurring as the same is extended with respect to its point of support and with sag of the upright occurring as the unit is moved to an elevated position.

Applicant has provided a first internally located sag compensating means to compensate for the sag that occurs in the cross arm and has further presented a rigid extension that insures upright relationship of the upright column regardless of the position of the measuring unit.

The two sag compensation means operate independently of each other but have the effect of complementing each other during their combined use so as to minimize inaccuracy.

---

This invention relates to the art of measuring devices for marking, checking or measuring locations on planar surfaces and in particular has reference to a device wherein deflection of the marking, checking or measuring arm due to its weight can be readily compensated for to insure accurate measurement.

Applicant's earlier United States Patents 3,069,778 and 3,129,512 disclosed layout devices designed to permit three axis measurement and, in general, these devices consist of a base, an upright standard or column secured to the base for movement in unison therewith and a bracket carried by the upright standard and shiftable axially of the standard. This bracket, in turn carries a cross arm that it shiftable transversely thereof and which carries a scribing means on one of its ends. In this fashion the cross arm is moved along its axis relatively of the bracket to accomplish measurement or scribing along one axis of movement and the bracket itself is moved along the axis of the upright standard to accomplish measurement or scribing along the second axis. Measurement along the third axis is accomplished by moving the base linearly on a table having a series of right angle slots therein.

While these devices are generally satisfactory in operation, it has been found that certain slight inaccuracies in measurement may occur due to deflection of either the cross arm or the upright standard or of both these members.

These inaccuracies can arise in two ways. First, for example, when the cross arms of such devices as are shown in applicant's earlier patents are fully extended to either side of the bracket, the weight of the same causes a slight deflection or sag in the arm which causes a corresponding inaccuracy of the measurement in the outboard end of the arm.

Thus, accuracy of measurement is to a certain degree proportional to the distance that the scribing or measuring means are disposed from the column which is the point of support for the arm. Assuming then that the arm has measuring means on one end, when the arm is retracted so that the measuring end is adjacent the column, only minimal forces will act on that end and a correspondingly

2 minimal deflection will occur. However, as the measuring means moves away from the column the force on the arm increases due to gravity and the outboard end tends to sag or deflect away from a horizontal position.

Second, and in addition to the deflection just noted, when the bracket is disposed adjacent the top of the upright standard and the cross arm is extended, the weight of the same has a further tendency to deflect the upright standard itself.

While the deflection or sag above referred to is minimal (in the normal instance being measured in hundredths or thousandths of inches), devices of this type are utilized for layout or measurement of very precise patterns and the tolerances involved are normally such that as close to perfect measurement as possible is necessary so that even slight inaccuracies are important.

It has been found that the first noted deflection can be cured by providing a relatively rigid elongate rod within the cross arm itself and further by providing pressure means carried by the cross arm and bearing against this rod so that upon actuating the pressure means, a reaction occurs to cause a deflection of the cross arm so that any sag or deflection in the cross arm can be compensated for. In effect the normally straight cross arm is bowed or arched to a predetermined arcuate configuration. In this way, when moving the arm from retracted to extended position the outboard end thereof is progressively raised to compensate for the sag or deflection that would otherwise occur. This insures a straight line configuration at the point of maximum extension.

It has also been found that the deflection of the upright standard above noted can be compensated for by providing an auxiliary upright member that interconnects the base and the top of the upright standard and is disposed out of parallelism with the standard. The net effect of this member is to form a quadrilateral with the base, the upright, the auxiliary member and the means interconnecting the top of the upright and the auxiliary member forming its sides. This quadrilateral, in reality, has the shape of a truncated right triangle and enables the auxiliary member to counteract forces tending to bend or deflect the upright and control the deflection to insure accurate measurement by the arm.

In this way both of the deflections involved can be compensated for with the two sag compensating means normally complementing each other to insure accuracy of measurement. However, when used with specialized devices either of these means could be used alone to serve a particular need.

Production of an improved layout machine having the above advantages accordingly becomes the principal object of this invention, with other objects thereof becoming more apparent upon a reading of the following brief specification, considered and interpreted in the light of the accompanying drawings.

Figure 1:
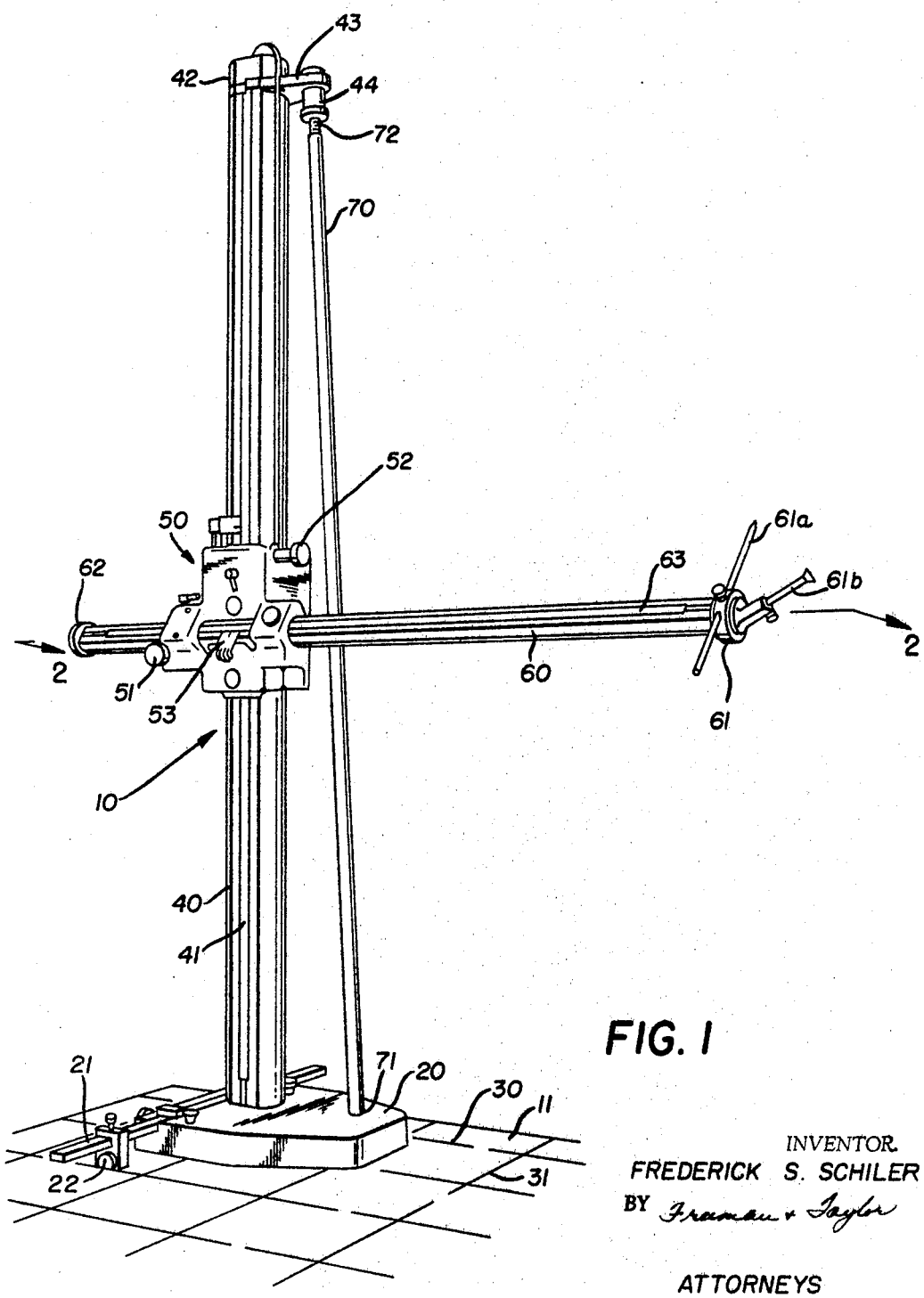
FIGURE 1 is a perspective view of the improved layout device.

Referring now to the drawings and in particular to FIGURE 1 thereof, the improved layout device, generally designated by the numeral 10, is shown including a base 20, an upright standard 40 projecting therefrom, a bracket 50 slidably received on the upright standard 40, a cross arm 60 slidably carried by the bracket 50 and a sag compensating rod 70 interconnecting the base 20 and the top 42 of the upright 40.

With regard to the detailed structure of the layout device, only a general description will be given with construction and operation of the same being clearly described in detail in United States Patents 3,069,778 and 3,129,512.

Accordingly, and again referring to FIGURE 1, the base 20 is shown with a scale 21 slidably received along one edge thereof. Attached to this scale is a stop member 22.

The base 20 rests on a surface table 11 which has a series of slots or grooves 30 and 31 running at right angles to each other across its surface. Stop member 22 of the base 20 is intended to engage the slots so that straight line movement of the base can be accomplished by simply running the same along the slots with measurement being taken on scale 21 to achieve one axis of measurement.

Projecting upwardly from and secured to the base 20 is the upright standard 40 which also includes a scale member 41 extending along its longitudinal axis. This upright standard 40 has a bracket 50 slidably received thereon and this bracket is adjustable along the longitudinal axis of the upright standard by means of knob 52 with the amount of such movement being measurable by scale 41 to achieve a second axis of measurement.

The bracket 50 also carries a cross arm 60 which can be moved transversely of the bracket by the knob 51 on rollers (not shown) carried interiorly of the bracket and with cross arm 60 also carrying a scale 63 which can be coordinated with the scale 53 of the bracket so that such movement of the arm 60 can be measured along a third axis of measurement.

Additionally, the arm 60 also has opposed enlarged end members 61 and 62 with the end 62 normally merely comprising a flange which prevents complete removal of the arm from the bracket while the opposed end 61 of the arm carries a measuring device or scribing means 61a and 61b which can be used to lay out a pattern on the casting as clearly described in applicant's earlier patents above referred to.

Turning next then to the sag compensation means themselves, it is first noted that the upright standard 40 has a plate or top cap 43 that is fixed to its upper end 42, with the plate 43 projecting normally to the axis of the column and carrying a threaded fitting 44 on its projecting portion. A compensating rod 70 has one end threadingly received in this fitting 44 and has its other end received on the base 20. It should be noted here that the rod 70 is positioned so as to be out of parallelism with the longitudinal axis of the column 40 and in this way a quadrilateral shape is formed by the base 20, column 40 and rod 70 and plate 43 with this quadrilateral having the general form of a truncated right triangle. The threaded connection between rod 70 and fitting 44 permits the column to be put into true vertical condition prior to operation since by adjustment at this point the leg of the quadrilateral formed by rod 70 is effectively lengthened or shortened as desired and column 40 is correspondingly aligned.

Figure 3:
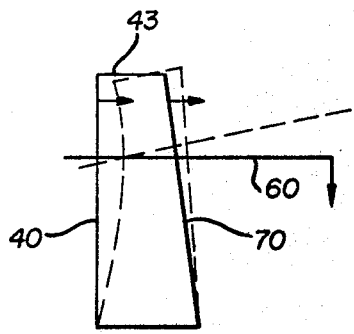
FIGURES 3 and 4 are schematic line drawings showing the effect of the sag compensation means on the column.

Once the column has been properly aligned this structure permits compensation for column deflection as can be seen schematically in FIGURE 3. Thus, when the arm 60 is elevated on and extended to the right of column 40 the weight of the arm pulls the top 42 of the column to the right and would tend to drop end 61 of arm 60. However, since the basic 90 degree angular relationship between column 40 and plate 43 is fixed, all of these members are moved to the right as shown in dotted lines. Thus, the point of connection between inextensible rod 70 and plate 43 is elevated and the point of connection between column 40 and plate 43 is lowered. This movement of the rod 70 to the right causes a force to act upward against plate 43 at the point of connection of plate 43 and rod 70. In order to maintain the 90 degree angular relationship between plate 43 and column 40 the column is then forced to bow to the right as also shown in dotted lines.

Since arm 60 is supported on column 40 this has the effect of raising its outboard end 61 to compensate for deflection that would otherwise occur therein.

Figure 4:
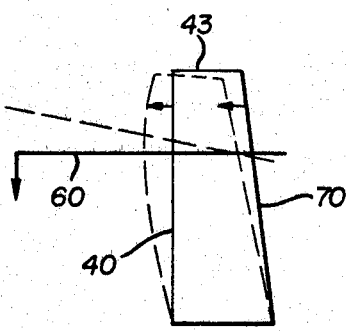

Similarly in FIGURE 4, where a machine is used with scribing means on left end 62 of arm 60 or where a scriber is disposed on both ends of the arm, there is a schematic showing of the effect of elevating and extending the cross arm 60 to the extreme lefthand position.

Here, however, the top 42 of column 40 is moved to the left and lowered below its original plane and pulls plate 43 and rod 70 with it. Also due to the fixed relationship between these members, the point of connection between rod 70 and plate 43 is lowered a greater distance than the point of connection between column 40 and plate 43. In order to maintain the angular relationship between column 40, plate 43 and rod 70 the column is forced to bow to the left as shown in dotted lines in FIGURE 4.

This has the effect of raising the end 62 of arm 60 which is carried on column 40 to compensate for deflection from the horizontal that would otherwise occur.

It should be noted here that in the schematic drawings shown in FIGURES 3 and 4 that an exaggerated bowing of the upright 40 is shown for illustration purposes, with the actual bowing or deflection being measured in hundreths or thousandths of inches.

In addition to the above noted sag compensation means associated with the upright 40, the arm 60 is also provided with supplementary self-contained sag compensating means that serve to compensate for sag that would otherwise occur when the cross arm 60 is extended as shown in FIGURE 1.

Figure 2:
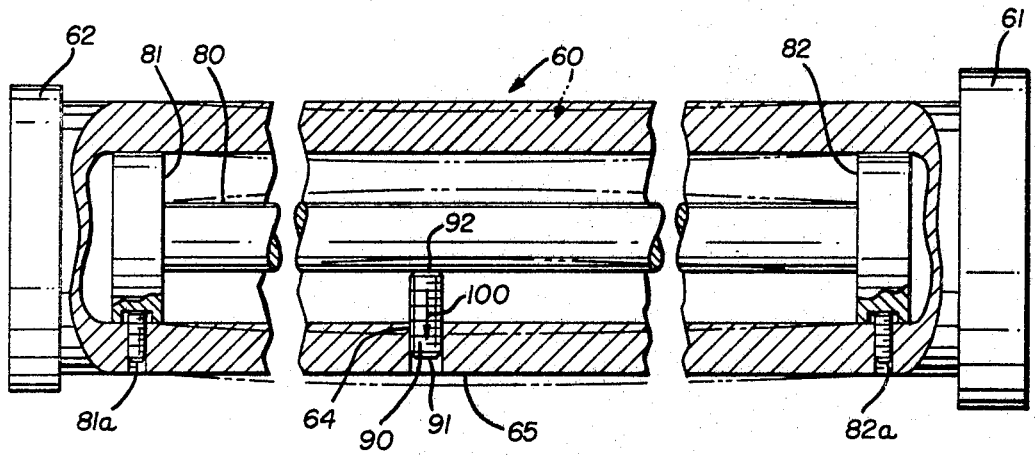
FIGURE 2 is a section of the cross arm of the layout device taken along the lines 2—2 of FIGURE 1.

To this end, the cross arm 60 is shown hollow to permit telescopic reception therein of a rod 80 which extends throughout substantially the entire length of the arm 60, with rod 80 having enlarged end pieces 81 and 82 that have a diameter substantially equal to the interior diameter of the arm 60 so that their peripheries bear against the inside surface of the arm 60 as shown in FIGURE 2.

Locating or positioning screws 81a and 82a are provided to fix the ends 81 and 82 of the rod 80 in position inside the arm, although these may be dispensed with in the event close tolerances are maintained.

Spaced from the end 62 of arm 60, at a distance approximating the spacing of the rollers in bracket 50, is a threaded opening 64 that communicates with the interior of the arm. A set screw 90 is threadingly received in this opening 64 of arm 60 and has its head 91 received entirely within the opening 64 at all times. In this fashion, the head of the screw 90 does not project beyond the surface of the arm 60 and thus the arm 60 may freely slide transversely of the bracket 50.

With the screw 90 thus supported with respect to cross arm 60, the same may be utilized for sag compensation purposes, merely by rotating the same in the proper direction required for inward advance. When the inboard end 92 engages rod 80, further inward movement will result in the creation of a reaction force being applied against arm 60 in the direction of arrow 100.

The end result of this reaction, or counter force against arm 60, is the deflection of the arm 60 to the predetermined bowed position shown in chain-dotted lines in FIGURE 2, with end 61 of the arm 60 being raised by such deflection so that sag occurring at the outboard end will be compensated for. The positioning of the screw 90 from the end 62 of arm 60 a distance approximating the spacing of the rollers of bracket 50 insures that pressure is placed at the point at which the greatest bending of arm 60 from the force of gravity on end 61 would normally occur, when the same is in extended position. This insures maximum counter-deflection at the outboard end 61 of the arm.

Once the above has been accomplished, instead of being straight, the arm 60, having been bent about its point of contact with screw 90, will have been deformed so as to be locked into an arcuate configuration when viewed from the side, for example, and movement of the point of support of the arm, by moving the arm relatively of the bracket from retracted toward extended position, will, of course, change the elevation of the end of the arm due to the arcuate configuration formed by the arm.

Assuming then that no gravitational force acted on the arm 60 when the arm is in fully retracted position and end 61 is adjacent column 40 and the end 61 would be disposed above the horizontal only slightly. By the same token, as the arm is extended, the outboard end 61 would be raised further above the horizontal due to the fixed curved configuration of arm 60. However, in fact, gravitational forces do work on the arm and, the arm encounters increased deflection forces that tend to drop it below the horizontal the further its outboard end is extended from column 40. However, these forces are counteracted by the bowing of the arm so that the projecting portion of the arm maintains a horizontal straight line configuration for accurate measurement at all times.

Figure 5:
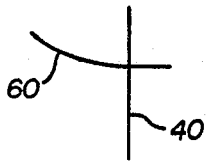
FIGURES 5 through 7 are schematic line drawings showing the operation of the sag compensation means on the cross arm.
Figure 6:
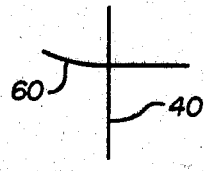
Figure 7:
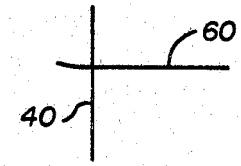

This is shown schematically in FIGURES 5 through 7 wherein arm 60, having been bowed, is shown moving from fully retracted position (FIGURE 5) through an intermediate position (FIGURE 6) and finally to fully extended position (FIGURE 7).

Here again it should be noted that the amount of deflection shown is somewhat exaggerated for purposes of illustration, with the distances involved being measurable in hundreths or thousandths of an inch.

Thus, it has been shown how by providing sag compensation means carried interiorly of the cross arm, that deflection due to the weight of the arm can be compensated for and accurate measurement can be attained.

It has also been shown how, by providing a compensating rod interconnecting the base and the top of the upright standard, that deflection at the end of the arm caused by bending of the upright can also be compensated for.

It should be noted that while the compensation means have been shown as used on a device having measuring means 61 on one end of the arm 60 it should be apparent that the principle involved would be equally applicable if end 62 also carried measuring means. In this case a pair of screws similar to the set screw 90 would be used with the same either being spaced from ends 61 and 62 as screw 90 has been shown spaced from end 62 or being disposed adjacent the midpoint of cross arm 60. In either case, operation of the same for sag compensating purposes would be similar to that described above.

Finally, it should be noted that while the device in question has basically been described in the context of a layout device that the principles involved are equally applicable to inspection devices wherein sag or deflection due to the weight of the arms are encountered.

Similarly, while the invention has been described in conjunction with a measuring or layout device movable along three axes, it is believed apparent that the inventive concept herein disclosed has equal utility in other applications. Thus, the compensating means carried by arm 60 could be used on any layout or measuring devices wherein an arm projects from a fixed surface such as a wall.

Also, the invention is not limited to use with measuring, layout, or marking devices but could be used with any device, such as a welding arm, which is susceptible to deflection.

Therefore, while a full and complete description of the invention has been set forth in accordance with the dictates of the patent statutes, it is to be understood that the invention is not intended to be limited to the specific embodiment herein shown.

What is claimed is:

1. A measuring device of the character described, comprising:
   (A) a base;
   (B) an elongate standard projecting from said base at right angles thereto;
   (C) a bracket movable along the axis of said standard;
   (D) a hollow, elongate normally straight cross arm carried by said bracket and being movable relatively thereof along the axis of said cross arm;
   (E) measuring means carried on one end of said arm;
   (F) sag compensation means for compensating for the horizontal deflection that would otherwise occur at the end of said elongate hollow arm as it moved horizontally and axially and relatively of said bracket, said means comprising:
      (1) an elongate rod disposed within said cross arm and secured thereto at its opposed ends, and
      (2) adjustable pressure means adapted to bear against said rod and said cross arm and adapted to bend said cross arm out of its normally straight condition.

2. The device of claim 1 further characterized by the fact that said last mentioned means include:
   (A) a screw
      (1) threaded into said cross arm; and
      (2) bearing against said rod
         (a) whereby adjustment of said screw deforms said cross arm.

3. The device of claim 1 further characterized by the fact that said rod has a circumference substantially less than the interior dimension of said arm and has a pair of enlarged flanges at its opposed longitudinal ends, with said flanges substantially corresponding to the interior dimension of said arm; whereby said rod fits snugly into said arm at its opposed ends while having its central portion spaced from said arm.

4. The device of claim 2 further characterized by the fact that said screw is disposed adjacent to the end of said arm opposite said measuring means by a distance such that said screw is disposed adjacent the point of support of said arm when said arm is in fully extended position with respect to said bracket.

5. A measuring device of the character described, comprising:
   (A) a base;
   (B) an elongate upright column projecting from said base at right angles thereto;
   (C) a bracket movable along the axis of said column;
   (D) a hollow, elongate normally straight cross arm carried by said bracket and being movable relatively thereof along the axis of said cross arm; arm;
   (E) measuring means carried on one end of said arm;
   (F) sag compensation means for compensating for the the vertical deflection that would otherwise occur in said upright column as said projecting cantilevered cross arm moved upwardly thereon, said means comprising:
      (1) a base member adapted to support said column in an upright position;
      (2) a bracket connected to and projecting from the upper end of said column at right angles therewith; and
      (3) a compensating rod having its opposed ends respectively connected to the projecting end of said bracket and said base, whereby a quadrilateral is formed by said base, said column, said bracket and said rod.

6. The device of claim 5 further characterized by the fact that the effective length of said compensating rod is variable.

7. The device of claim 5 further characterized by the fact that said compensating rod is disposed at an angle with respect to said column, whereby the upper end thereof that connects with said bracket is spaced in closer proximity than the lower end thereof.

8. In combination with a layout machine that includes a base; an upright column carried by said base; a bracket movable relatively of said column along the axis thereof; a hollow cross arm movable relatively of said bracket along the axis of said arm; and scribing means carried at one end of said cross arm, the improvement comprising:

(A) first sag compensation means adapted to compensate for the vertical deflection that occurs in said upright column when said bracket is moved away from said base and said scribing means are moved away from said bracket; said means comprising:
  (1) a base member adapted to support said column in an upright position;
  (2) a bracket connected to and projecting from the upper end of said column at right angles therewith; and
  (3) a compensating rod having its opposed ends respectively connected to the projecting end of said bracket and said base, whereby a quadrilateral is formed by said base, said column, said bracket and said rod.

9. In combination with a layout machine that includes a base; an upright column carried by said base; a bracket movable relatively of said column along the axis thereof; a hollow cross arm movable relatively of said bracket along the axis of said arm; and scribing means carried at one end of said cross arm, the improvement comprising:

(A) first sag compensation means adapted to compensate for the horizontal sag that occurs in said cross arm when said scribing means are moved away from said bracket; said means comprising:
  (1) an elongate rod disposed within said cross arm and secured thereto at its opposed ends; and
  (2) adjustable pressure means adapted to bear against said rod and said cross arm and adapted to bend said cross arm out of its normally straight condition.

References Cited

UNITED STATES PATENTS

| | | |
|---|---|---|
| 556,703 | 3/1896 | Starrett et al. |
| 2,952,918 | 9/1960 | Eickman. |
| 3,216,114 | 11/1965 | Bidwell et al. _____ 33—79 |

SAMUEL S. MATTHEWS, Primary Examiner